May 5, 1936.  P. L. GEER  2,039,955
METHOD OF AND APPARATUS FOR MELTING GLASS
Filed June 9, 1932  3 Sheets-Sheet 1
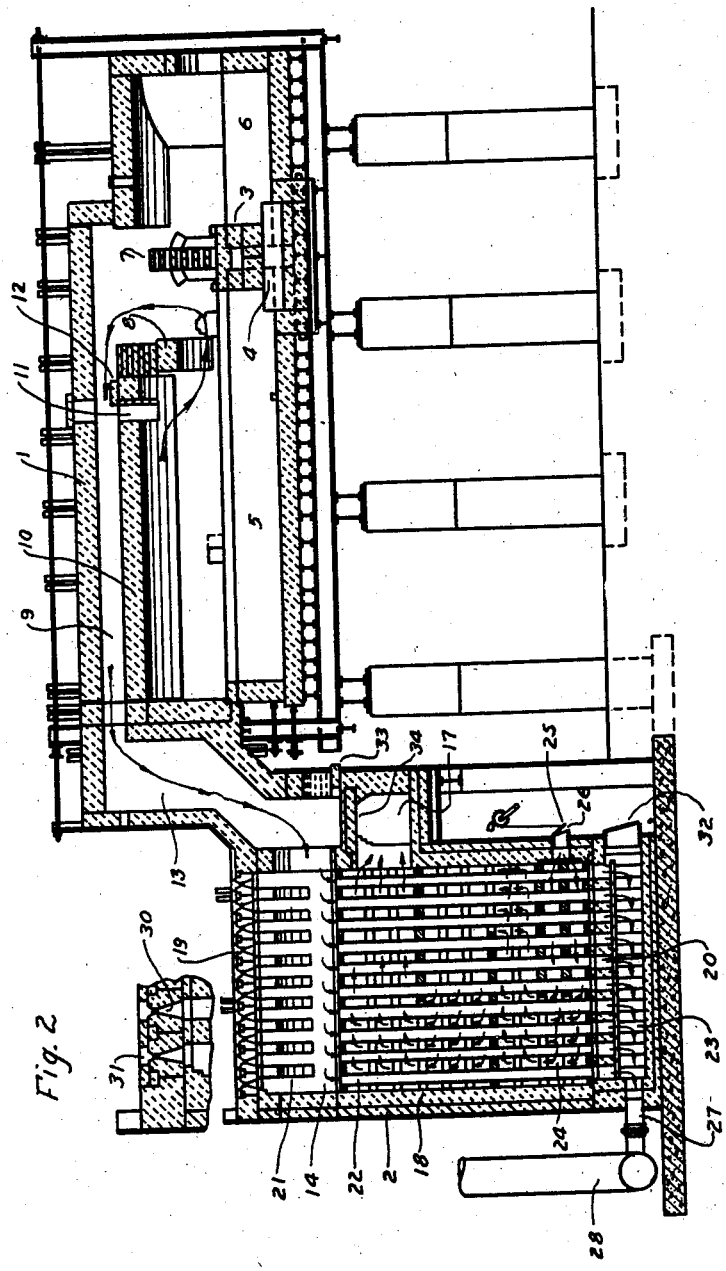
INVENTOR
Paul L. Geer
BY William B. Jaspert
ATTORNEY May 5, 1936. P. L. GEER 2,039,955
METHOD OF AND APPARATUS FOR MELTING GLASS
Filed June 9, 1932 3 Sheets-Sheet 2

INVENTOR
Paul L. Geer
BY William B. Jaspert.
ATTORNEY

May 5, 1936. P. L. GEER 2,039,955
METHOD OF AND APPARATUS FOR MELTING GLASS
Filed June 9, 1932 3 Sheets-Sheet 3
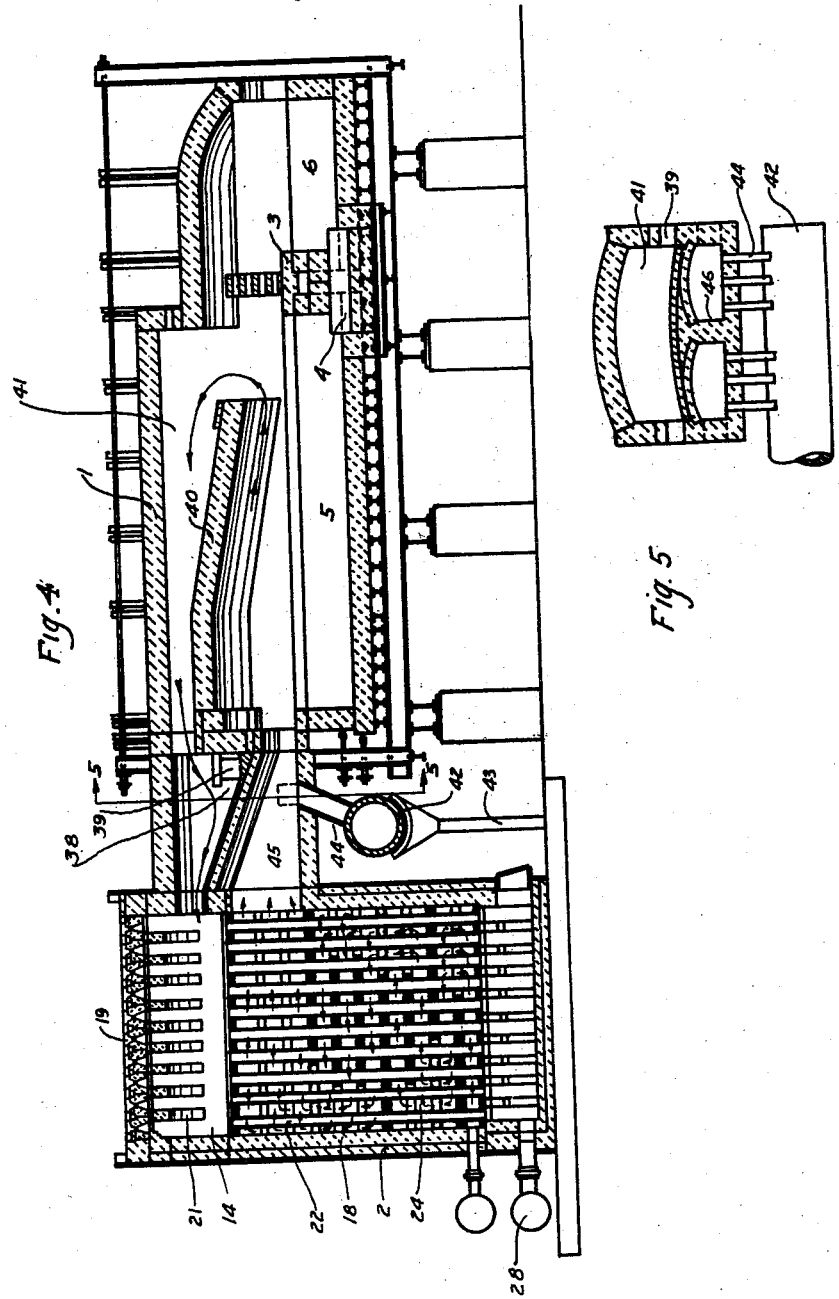
INVENTOR
Paul L. Geer
BY William B. Jaspert
ATTORNEY Patented May 5, 1936

2,039,955

UNITED STATES PATENT OFFICE 2,039,955

METHOD OF AND APPARATUS FOR MELTING GLASS

Paul L. Geer, Bellevue, Pa., assignor to Amco, Incorporated, Pittsburgh, Pa., a corporation of Pennsylvania Application June 9, 1932, Serial No. 616,176

9 Claims. (Cl. 49—54)

This invention relates to glass melting tanks and recuperators therefor, and the present application is a continuation in part of my copending application Serial #543,801 filed June 12, 1931.

It is among the objects of the invention to provide apparatus for melting glass in which a gaseous heating medium is adapted to continuously flow along the longitudinal flow axis in one direction only with the movement of the glass in the furnace hearth and which shall be adapted to retain the gaseous medium against the surface of the glass for a controlled distance.

A further object of the invention is the provision of a glass melting tank with a recuperator structure which is arranged to supply a plurality of fuel streams with a regulable supply of preheated air adjacent the rear of the glass melting hearth and above the level of the glass and which shall be adapted to withdraw the products of combustion at the end of the furnace remote from where the materials are charged into the tank and direct said gases over a relatively long path above the glass melting tank to a recuperator structure for preheating the air that is supplied to the fuel at the charging end of the furnace.

The invention will be more clearly understood in connection with a description of the accompanying drawings constituting a part hereof in which like reference characters designate like parts and in which:—

Figure 1 is a vertical cross-sectional view extending longitudinally of a recuperator and glass melting furnace structure embodying the principles of this invention;

Figure 2 is a cross-section of a detailed portion of the roof structure of the recuperator;

Figure 3:
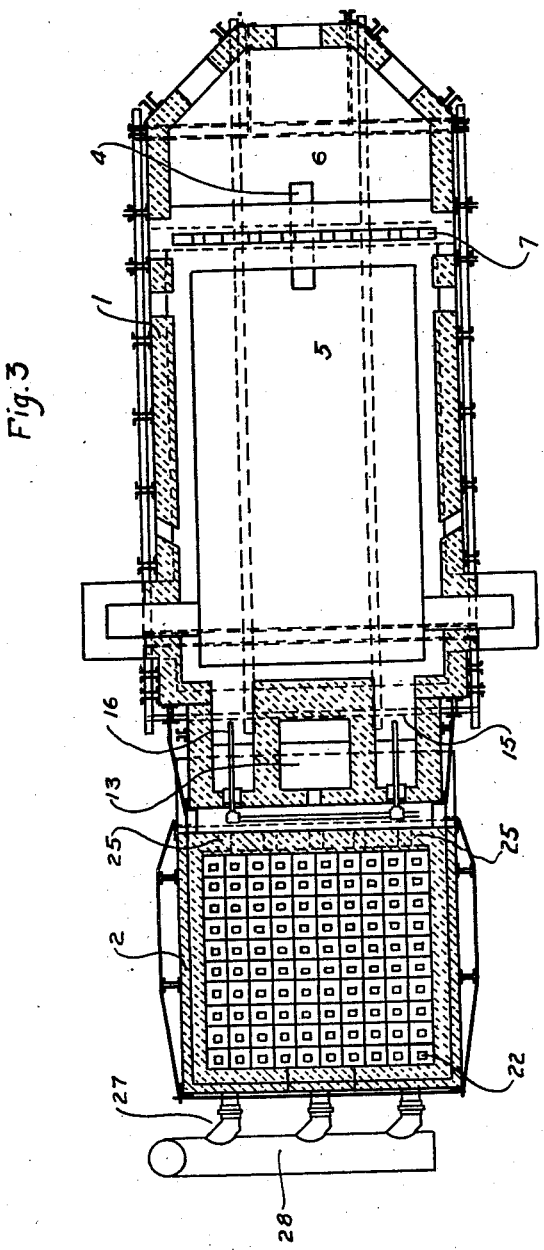

Figure 3 a longitudinal horizontal cross-section of the recuperator and glass melting tank shown in Figure 1;

Figure 4 a cross-sectional view of a modified form of tank; and

Figure 5 a transverse section taken along the line V—V, Figure 4.

In the drawings, I generally designates a glass melting tank and 2 the recuperator structure. The glass melting tank is constructed with a bridge wall 3 having a submerged passage 4 through which the molten glass or metal passes from a melting chamber 5 to a working chamber 6. A partition wall 7 is built on the bridge wall 3 and a second partitioned wall 8 is constructed in parallel relation with the wall 7 to constitute a passage to a waste gas outlet 9 above the crown 10 of the glass melting tank.

The crown is provided with a passage 11 which may be controlled by a damper 12 to divert the gases to cause them to pass between the walls 7 and 8 when it is desired to obtain an increased temperature at the front or working end 6 of the tank.

The horizontal passage 9 communicates with a vertical waste gas passage 13 leading to a distributing chamber 14 of the recuperator structure 2.

As shown in Figure 3 the waste gas passage 13 is disposed between a pair of burner ports 15 in which fuel burners 16 are disposed as shown in Figure 1. The ports 15 communicate with a common passage 17 leading from the top horizontal passages of the recuperator structure through which preheated air is supplied to the burners 16.

The recuperator consists of side, top and bottom walls, 18, 19, and 20 respectively and the top wall 19 is provided with reinforcing arches 21. A plurality of vertical tubes or flues 22 extend from the distributing chamber 14 of the recuperator to the exhaust chamber 23 at the bottom of the recuperator and the vertical tubes 22 are constructed of tile which form horizontal air passages 24 through which air is conducted from inlets 25 at the bottom of the recuperator to the preheated air passage 17 at the top of the recuperator.

The air inlets 25 are provided with adjustable dampers 26 to regulate the amount of air passing through the recuperator tile structure there being five air inlets shown in Figure 3 of the drawings to provide for the proper distribution of the air in the flue structure of the recuperator.

The common exhaust passage or chamber 23 at the bottom of the vertical waste gas passages is similarly connected by outlet connections 27 to an exhaust manifold 28 which passes either to a stack or to an exhauster. The multiple outlets 27 and the distribution chamber 14 at the top of the recuperator provide uniform distribution or flow of the waste gases from the top to the bottom of the recuperator.

As shown in the enlarged detail view of Figure 2, a plurality of poke holes 30 are provided in alinement with the vertical flues 22 and these poke holes are provided with insulated plugs 31 to prevent the escape of the gases or heat when the poke holes are closed in the normal function of the recuperator.

The poke holes provide access to the vertical tubes 22 to permit cleaning them by the injection of a conduit to blow out the tubes 22 if they become deposited with slag from the waste gases passing therethrough and the port holes further permit of extending a rod into the vertical tubes 22 in the event it is necessary to remove the slag from the inner walls thereof. The vertical tubes are constructed to provide straight uninterrupted walls on the interior thereof so as to reduce the friction of the waste gas flow to a minimum and to prevent the accumulation or lodging of slag in the tube.

The horizontal air passages 24 of the recuperator structure are spaced relatively close to produce a maximum length of path for the travel of the air with the final portion of the path adjacent the wall of the waste gas distributing chamber 14.

The exhaust chamber 23 of the recuperator constitutes an ash pit having the door 32 through which the solid particles of slag are removed when the tubes are cleaned out and a sloping sump 33 is provided at the bottom of the waste gas passage 13 to permit of the removal of molten slag accumulating on the partition 34 at the entrance end of the recuperator.

The operation of the recuperator structure is briefly as follows:

The waste gases from the melting tank are drawn either through the vertical passage constituted by the walls 7 and 8 when the flue 11 is closed by the damper 12 or if the damper is open the waste gas travels from the vertical flue or slot into the passage 9 between the roof 10 and the crown wall of the melting tank. The hot gases then pass downwardly through the passage 13 into the distributing chamber 14 of the recuperator structure where it is more or less stabilized or balanced and then it is drawn vertically downward through all of the tubes 22 simultaneously.

Because of the common exhaust chamber 23 at the bottom of the tubes, the gases are subjected to a uniform negative pressure and are drawn downwardly through the exhaust manifold 28. Simultaneously, the air is drawn through the intakes 25 into the horizontal passages 24 passing back and forth horizontally towards the upper region of the recuperator and gradually increasing in temperature as it absorbs the heat of the high temperature gases at the top of the recuperator. The final path of the air is adjacent the wall of the distributing chamber 14 and it passes at a uniform temperature to the passage 17 leading to the burner ports 15.

By regulating the dampers 26, a uniform volume of air is drawn through all parts of the recuperator structure so that all of the air is at a uniform temperature as it leaves the recuperator thereby increasing the temperature generally of the air entering the burner ports 15.

If the slag carried over in a gaseous state from the melting tank accumulates on the inner wall of the vertical tubes, the plugs 31 or the poke holes 30 are lifted and the deposits are removed either by an air blast or by a rod. In this manner, the heat exchange efficiency or capacity of the tubes is maintained, and clogging is prevented.

By passing all of the waste gases initially into the distributing chamber 14, the entire volume of the gas is passed through such a large number of vertical tubes that the heat of the gases is not concentrated on a small number of tubes as in the type of recuperator where the waste gases enter the recuperator structure in a vertical direction and on this account the refractory material is not subjected to the destructive corrosive action of the hot gases as in the prior art devices.

It is evident from the foregoing description that a recuperator structure made in accordance therewith provides for efficient exchange of heat between the waste gas passing from the furnace chamber and the air passing into the chamber and by uniformly heating all of the air passing through the recuperator structure, the air is of a substantially higher temperature as it enters the glass melting chamber.

By providing the poke holes in the roof of the recuperator and by employing vertical tubes with uninterrupted walls, the tubes are maintained in good condition and the recuperator can be cleaned and reconditioned without necessitating frequent renewal and without discontinuing its operation for any substantial period of time.

In the modifications shown in Figures 4 and 5 of the drawings, the furnace structure is of a double crown type as in Figure 1, differing mainly in that the top wall 1 of the tank is below the top 19 of the recuperator structure, whereas in Figure 1 the roof of the tank is substantially higher than that of the recuperator.

By placing the tank roof or crown in line with the recuperator, the waste gases flow in a direct line to the upper chamber 14 of the recuperator structure with the exception that a pit 38 is provided for precipitating the solid particles entrained in the gas which are removed from the opening 39. The inner crown wall 40 of the melting tank depends downwardly to provide a flared passage 41 which functions to slow up the gases as they are leaving the melting chamber thereby increasing the temperature of the chamber adjacent the bridge wall 3.

A further deviation from the structure of Figure 1 is the supply of gaseous fuel through a producer gas main 42 that is carried by a support 43 and which has connections through a plurality of conduits 44 with the preheated air passages 45 leading from the recuperator. The arrangement of the burner ports from the gas main 42 is shown in Figure 5 of the drawings in which the preheated air passages are shown divided by a wall 46 to obtain better regulation of combustion within the melting chamber 5 of the glass tank.

The operation of the glass tank and recuperator structure of Figures 4 and 5 is the same as that explained in connection with Figures 1 to 3 excepting that no provision is made for drawing off the waste gases at any other portion of the melting chamber than at the end of the depending roof structure 40. Also, by virtue of the crown 40 extending downwardly, the products of combustion from the passages 45 are directed to the surface of the glass and batch material in tank 5 thus rendering the heat application more effective to the melting of the glass.

By slowing up the gases through the use of the flared passage 41 and by extending the inner crown 40 of the melting tank substantially the full length of the tank, the waste gases are delivered to the recuperator structure at lower temperatures thereby increasing the life of the refractory material of which the recuperator tile is constructed. The path of travel of the products of combustion is sufficiently long to produce any desired firing characteristics irrespective of the velocity of the gases entering the melting chamber, and the adjacent partition walls separating the preheated air passages from the waste gas passages are further of such length and area as to effect a maximum exchange of heat.

I claim:

1. In a glass melting furnace of the continuous recuperative type having a non-reversing flame the combination which comprises a melting chamber and a working chamber, heating ports for the furnace entering one wall of the furnace, a waste gas flue over the melting furnace for removing the gases, a wall between the melting end and the refining end and a depending wall intermediate the extremities of the melting end forming the inlet to the said waste gas flue, the said walls being offset vertically and horizontally to form a vertical flue and a heat shield to reduce the temperature of the glass in the working chamber.

2. In a glass melting furnace of the continuous recuperative type having a non-reversing flame the combination which comprises a melting chamber and a working chamber, heating ports for the furnace entering one wall of the furnace, a waste gas flue over the melting furnace for removing the gases, a wall between the melting end and the working end and a depending wall intermediate the extremities of the melting end forming the inlet to the said waste gas flue the said walls being offset vertically and horizontally to form a vertical flue, an outlet to the waste gas flue intermediate the said flue and the heat ports and means regulating the quantity of gases flowing in the said vertical flue to control the temperature in the working chamber.

3. A glass melting furnace having a relatively long melting chamber and a double crown, the lower crown of which is flared downwardly to conduct the gaseous flame from the burner ports forward of the tank adjacent the surface of the glass in the tank and return the waste gases above the lower crown towards the rear of the melting chamber through a waste gas passage gradually decreasing in cross-sectional area.

4. In a continuous glass melting furnace the method which consists in subjecting the material to the action of a heating flame projected unidirectional with the movement of the molten glass, deflecting the products of combustion in the direction of the glass pool at the end of the melting chamber of the furnace, and regulating the volume of the deflected gases intermediate of the ends of the furnace to control the temperature longitudinally of the furnace.

5. In a continuous glass melting furnace the method which consists in subjecting the material to the action of a heating flame projected unidirectional with the movement of the molten glass, and deflecting the products of combustion in the direction of the glass pool intermediate the ends of the melting chamber of the furnace to control the temperature longitudinally of the furnace.

6. In a continuous glass melting furnace divided by a bridge wall into a melting and working chamber, the step in the method of heating the glass materials which consists in subjecting the material to be melted to the heat of a flame conducted through a combustion laboratory from the charging area of the furnace toward the bridge wall across the furnace, varying the quantity of heat flowing therealong and directing said heat flame through a varying area of the laboratory toward the bridge to control the temperature of the material longitudinally of the tank.

7. In a continuous glass melting furnace divided by a bridge wall into a melting and working chamber, the step in the method of heating the glass materials which comprises subjecting the material to the heat of a flame of constant heat intensity and volume conducted from the charging area of the furnace toward the bridge wall and controlling the range of said flame toward the bridge to regulate the temperature longitudinally of the material to be melted.

8. A glass making furnace for containing a bath of molten glass and adapted at one portion thereof to receive glass making materials, said furnace having a bridge wall spaced from said portion and having a combustion space above the glass therein between the bridge wall and the place at which glass making materials are received therein, said space being of relatively restricted area intermediate the receiving end and the bridge wall, and means for projecting a combustible mixture into the space adjacent the receiving end and toward said relatively restricted portion of said space.

9. In a continuous glass melting furnace, a hearth, a combustion space above the hearth, a bridge wall disposed between the ends of the space and a roof parallel to the hearth for a substantial distance of said space and gradually deflecting downwardly toward the bridge wall to reduce the vertical cross section of the space adjacent the bridge wall.

PAUL L. GEER.